(12) United States Patent
Huang et al.

(10) Patent No.: US 8,220,486 B2
(45) Date of Patent: Jul. 17, 2012

(54) CONNECTING PIPING ASSEMBLY WITH A LIMITER

(75) Inventors: Cing-Jhong Huang, Hai-Qian Village (TW); Cing-De Huang, Hai-Qian Village (TW); Cing-Cih Huang, Shui-Mei Village (TW)

(73) Assignee: Canshow Industrial, Co., Ltd., Da-An Township, Taichung County (TW)

( * ) Notice: Subject to any disclaimer, the term of this patent is extended or adjusted under 35 U.S.C. 154(b) by 426 days.

(21) Appl. No.: 12/493,033

(22) Filed: Jun. 26, 2009

(65) Prior Publication Data
US 2011/0188921 A1    Aug. 4, 2011

(51) Int. Cl.
*F16L 37/32* (2006.01)
(52) U.S. Cl. ............... 137/614.04; 137/614.03; 285/86; 285/361
(58) Field of Classification Search ............ 137/614.03, 137/614, 614.04, 614.05; 403/23, 86; 285/86, 285/87, 89, 371, 398
See application file for complete search history.

(56) References Cited

U.S. PATENT DOCUMENTS

| | | | | |
|---|---|---|---|---|
| 408,320 | A * | 8/1889 | Powell | 285/86 |
| 532,589 | A * | 1/1895 | Schmidt | 285/87 |
| 2,896,977 | A * | 7/1959 | Hansen | 137/614.04 |
| 2,934,359 | A * | 4/1960 | Smisko et al. | 285/86 |
| 3,224,728 | A * | 12/1965 | Buseth et al. | 251/149.6 |
| 3,626,980 | A * | 12/1971 | Svensson | 137/614.2 |
| 4,875,715 | A * | 10/1989 | Dennany et al. | 285/87 |
| 4,909,545 | A * | 3/1990 | Hohol | 285/39 |
| 5,348,349 | A * | 9/1994 | Sloane | 285/86 |
| 5,738,143 | A * | 4/1998 | Faughn | 137/614.03 |
| 5,975,491 | A * | 11/1999 | Mann | 251/149.5 |
| 6,626,207 | B1 * | 9/2003 | Smith, III | 137/614.03 |

* cited by examiner

*Primary Examiner* — Kevin Lee
*Assistant Examiner* — Craig J Price
(74) *Attorney, Agent, or Firm* — Egbert Law Offices PLLC

(57) ABSTRACT

The present invention provides a connecting piping assembly with limiter, including a first connecting piping and a second connecting piping. The first connecting piping contains a first coupling end, a first assembly portion and a first flow channel. The second connecting piping contains a second coupling end, a second assembly portion and a second flow channel. The first and second assembly portions can be mated and positioned so that the first and second flow channels are interconnected. A locating part is provided with a polygonal through-hole, which can be slidably sleeved on the perimeter of the first and second assembly portions, such that the polygonal through-hole is mated with the perimeter of the first and second assembly portions. The locating part is positioned via a locator.

3 Claims, 7 Drawing Sheets

CONNECTING PIPING ASSEMBLY WITH A LIMITER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a connecting piping assembly, and more particularly to an innovative assembly which is permanently fixed by a limiter without falling out.

2. Description of Related Art Including Information Disclosed Under 37 CFR 1.97 and 37 CFR 1.98

Generally, the gas or water pipelines are connected securely by a connecting piping assembly for transfer and conveyance purposes.

This connecting assembly typically comprises a first adapter with first flow channel and a second adapter with second flow channel. Piping is connected at one end of the first adapter, and more piping is connected at one end of the second adapter. The first and second adapters are at least partially mated to ensure the connection of the first and second flow channels, thus enabling the circulation of gas or water from one piping to the others.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based on the structure of the present invention, first and second connecting piping are mated and positioned, and a locating part is slidably sleeved on the perimeter of respective first and second assembly portions. Thus, the polygonal through-hole of the locating part is mated with the first and second assembly portions of polygonal profile. Moreover, the first and second connecting piping cannot be rotated, thus preventing the disengagement of the first and second connecting piping, and maintaining the air-tight seal to realize highly reliable connection with improved applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
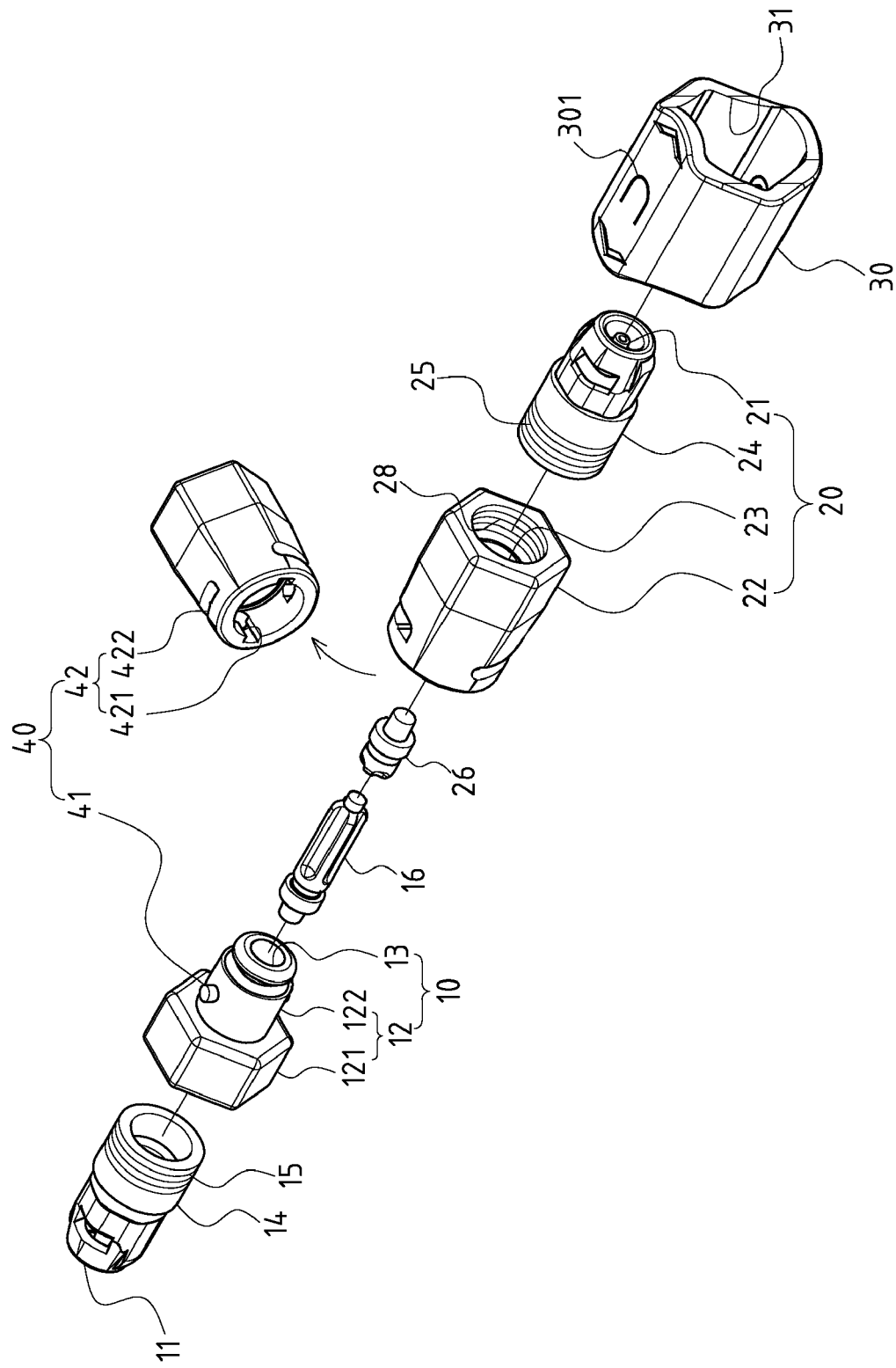
FIG. 1 shows an exploded perspective view of the preferred embodiment of the present invention.

FIGS. 1-4 depict preferred embodiments of a connecting piping assembly of the present invention with a limiter. The embodiments are provided for only explanatory purposes with respect to the claims.

The connecting piping includes a first connecting piping 10, which is provided with a first coupling end 11, a first assembly portion 12 and a first flow channel 13, and a second connecting piping 20, which is provided with a second coupling end 21, a second assembly portion 22 and a second flow channel 23. The first and second assembly portions 12, 22 can be assembled in a limited manner, such that the second flow channel 23 is connected with the first flow channel 13. The first and second assembly portions 12, 22 are of a polygonal profile.

There is a locating part 30 with a polygonal through-hole 31, which can be slidably sleeved on the perimeter of the first and second assembly portions 12, 22, such that the polygonal through-hole 31 is mated with the perimeter of the first and second assembly portions 12, 22. Moreover, the locating part 30 is positioned via a locator 32. With this invention, the first and second assembly portions 12, 22 can be assembled more securely and tightly.

The first connecting piping 10 contains a first piping head 14, at one end of which the first coupling end 11 is formed, and at the other end of which a male threaded portion 15 is set. The first assembly portion 12 is provided with an expanded angle block 121 and a reduced inner column 122. A female threaded portion is arranged within the expanded angle block 121 for assembly of the first piping head 14. The second connecting piping 20 contains a second piping end 24, at one end of which the second coupling end 21 is formed, and at the other end of which a male threaded portion 25 is set. The second assembly portion 22 is provided with a female threaded portion 28 for assembly of the second piping end 24. The first and second assembly portions 12, 22 are coupled securely via a locking unit 40.

The locking unit 40 is composed of a locking bulge 41 on the reduced inner column 122 of the first assembly portion 12 and a spacing groove 42 set for the second assembly portion 22. The spacing groove 42 contains an axial trough 421 and a circular trough 422.

Figure 5:
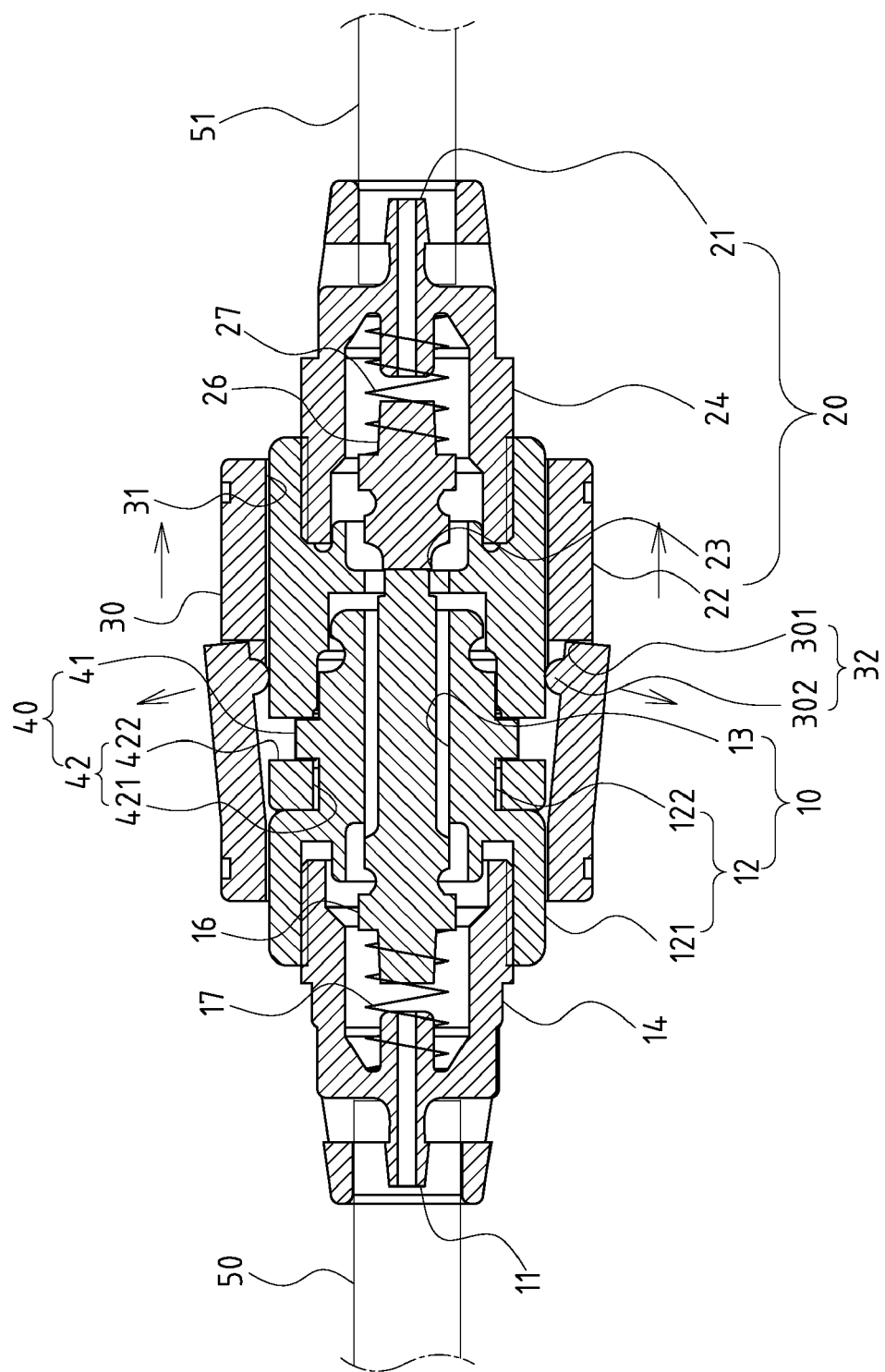
FIG. 5 shows a sectional view of the actuation of the preferred embodiment of the present invention.

Referring to FIG. 5, the connecting piping is available with a first check valve core 16 and a second check valve core 26.

The first check valve core 16 is linked to the first piping head 14 via a first elastic abutting member 17, while the second check valve core 26 is linked to the second piping end 24 via a second elastic abutting member 27.

The locator 32 has a recessed trough 301 formed for the locating part 30. A bulge 302 is vertically protruded from one end of the recessed trough 301. Referring also to FIG. 5, the locating part 30 can be slidably sleeved on the perimeter of the first and second assembly portions 12, 22, and positioned securely since the bulge 302 is locked into the circular trough 422 of the spacing groove 42.

Figure 2:
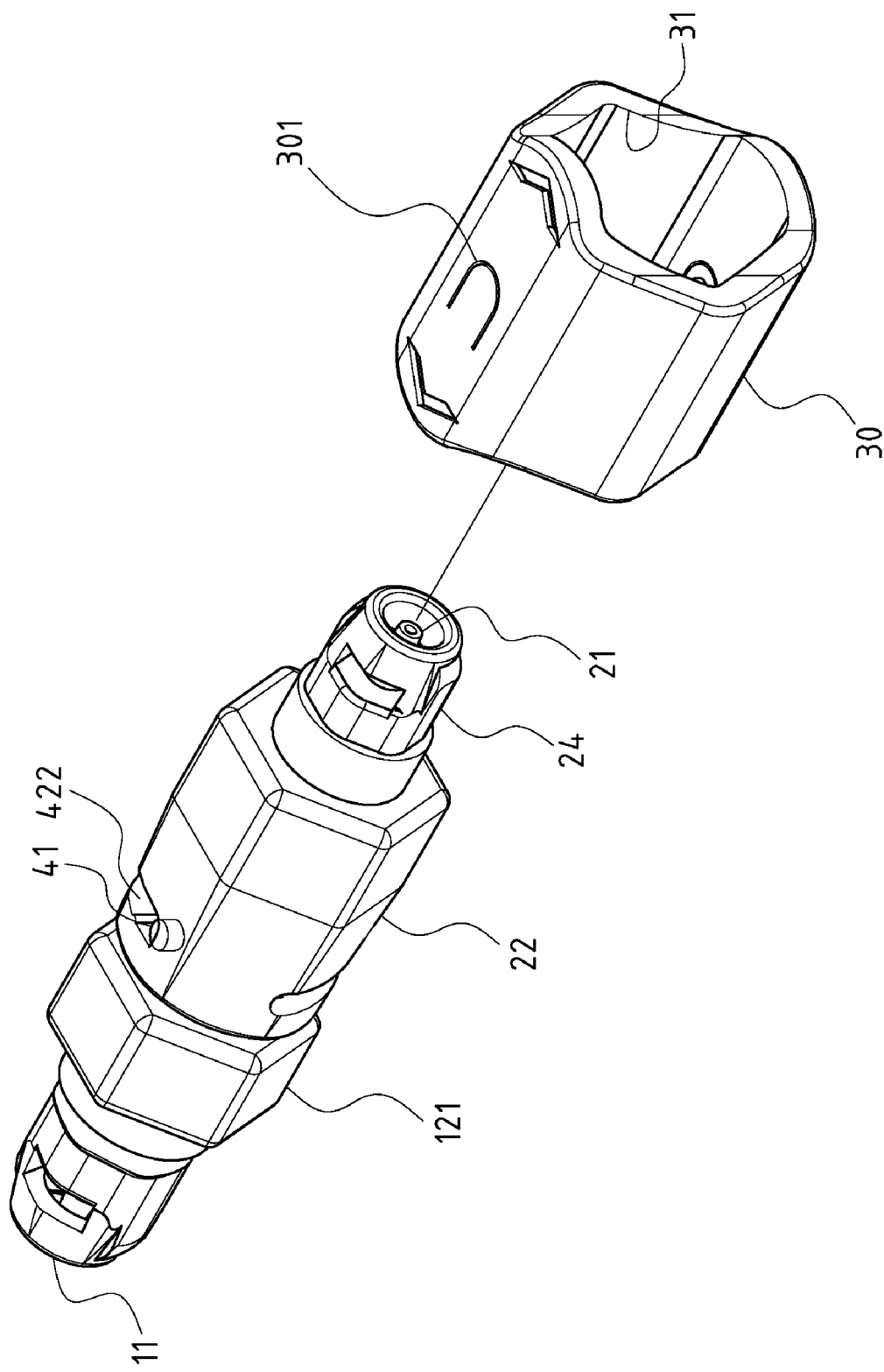
FIG. 2 shows a partially exploded perspective view of the preferred embodiment of the present invention.
Figure 3:
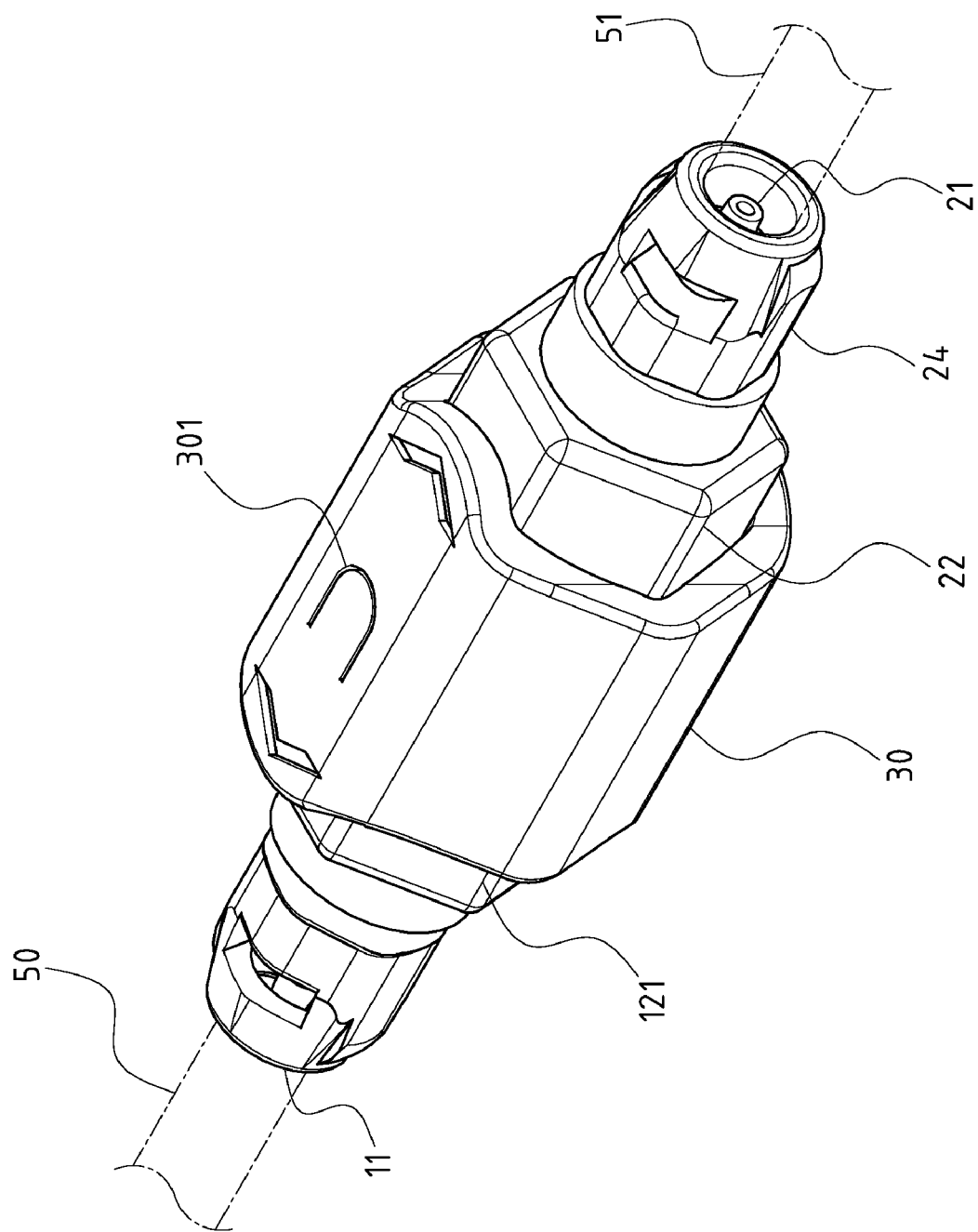
FIG. 3 shows an assembled perspective view of the preferred embodiment of the present invention.
Figure 4:
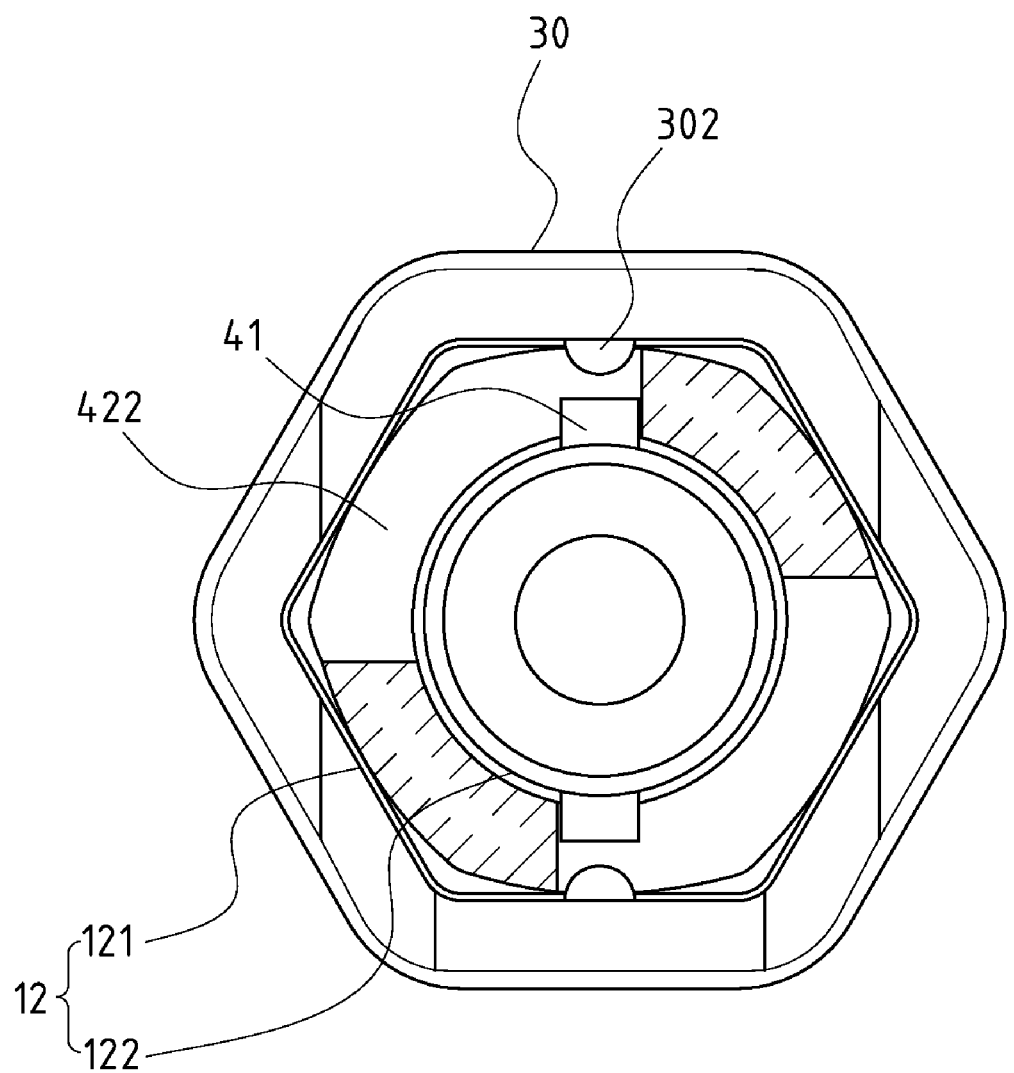
FIG. 4 shows an assembled sectional view of the preferred embodiment of the present invention.

Based on above-specified structures, the present invention is operated as follows:

Referring to FIG. 1, the first connecting piping 10 and second connecting piping 20 are assembled in a limited manner via the locking unit 40. The locking bulge 41 of the first connecting piping 10 is shifted to the axial trough 421 of the spacing groove 42, and then the first connecting piping 10 is rotated in the circular trough 422 so that the locking bulge 41 is rotated to one end of the circular trough 422. In such a case, the first connecting piping 10 and the second connecting piping 20 are connected unfixedly; so the first connecting piping 10 and the second connecting piping 20 can be rotated easily. Referring to FIG. 2, the polygonal through-hole 31 of the locating part 30 is sleeved onto the perimeter of the first and second assembly portions 12, 22. Referring to FIGS. 3 and 4, the locating part 30 allows the polygonal through-hole 31 to be mated with the first/second assembly portions 12, 22 of a polygonal profile. When the locating part 30 is assembled and positioned, the polygonal through-hole 31 is mated with the perimeter of the first and second assembly portions 12, 22, so the first and second connecting piping 10, 20 cannot be rotated but securely connected without disengagement.

Figure 6:
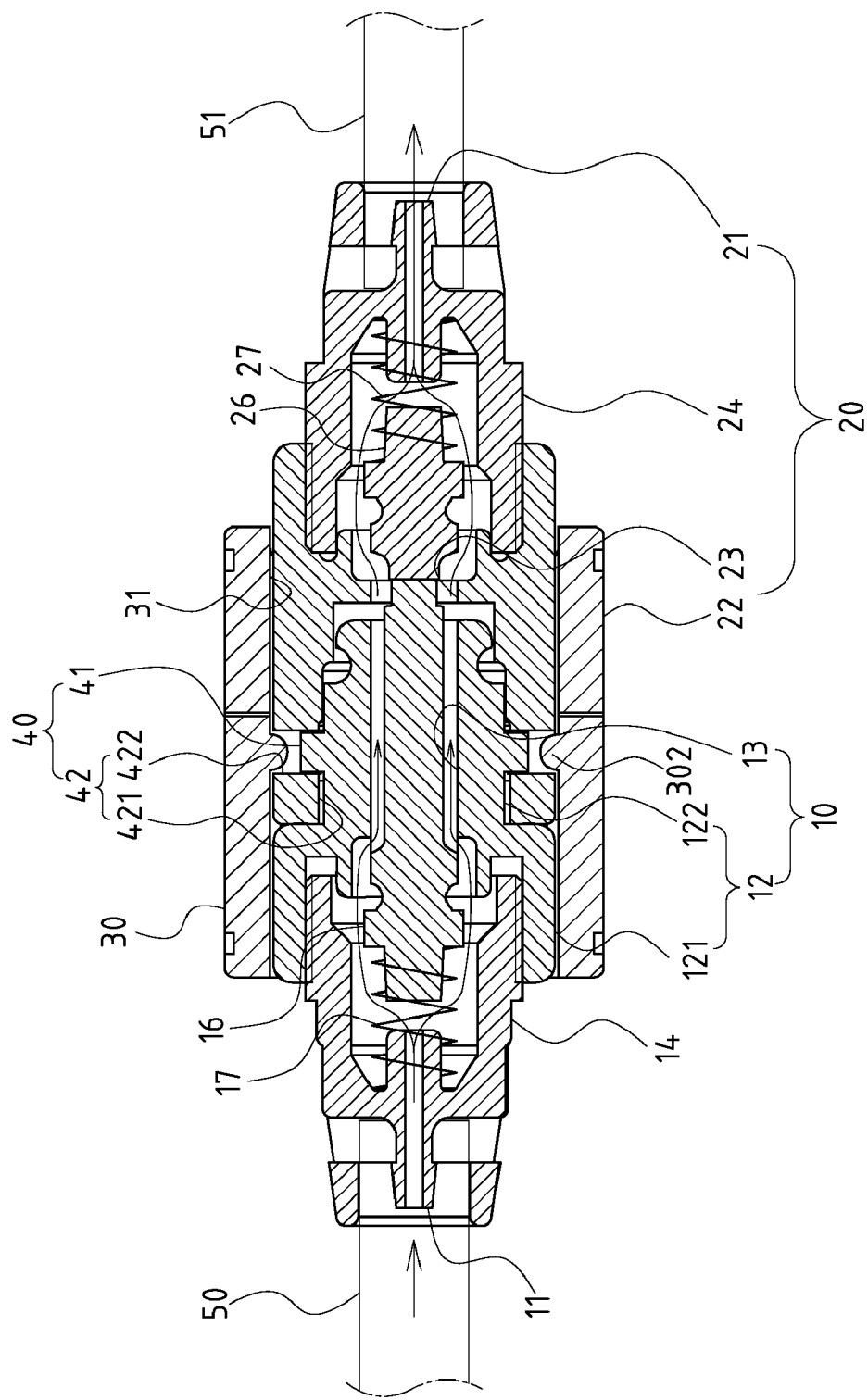
FIG. 6 shows a sectional view of another actuation of the preferred embodiment of the present invention.

Referring to FIG. 6, when the connecting piping is assembled, a piping body 50 could be connected to the first coupling end 11 of the first connecting piping 10, and the other piping body 51 connected to the second coupling end 21 of the second connecting piping 20, so that the gas or water in the piping bodies 50, 51 can be transferred through the first and second flow channels 13, 23.

Figure 7:
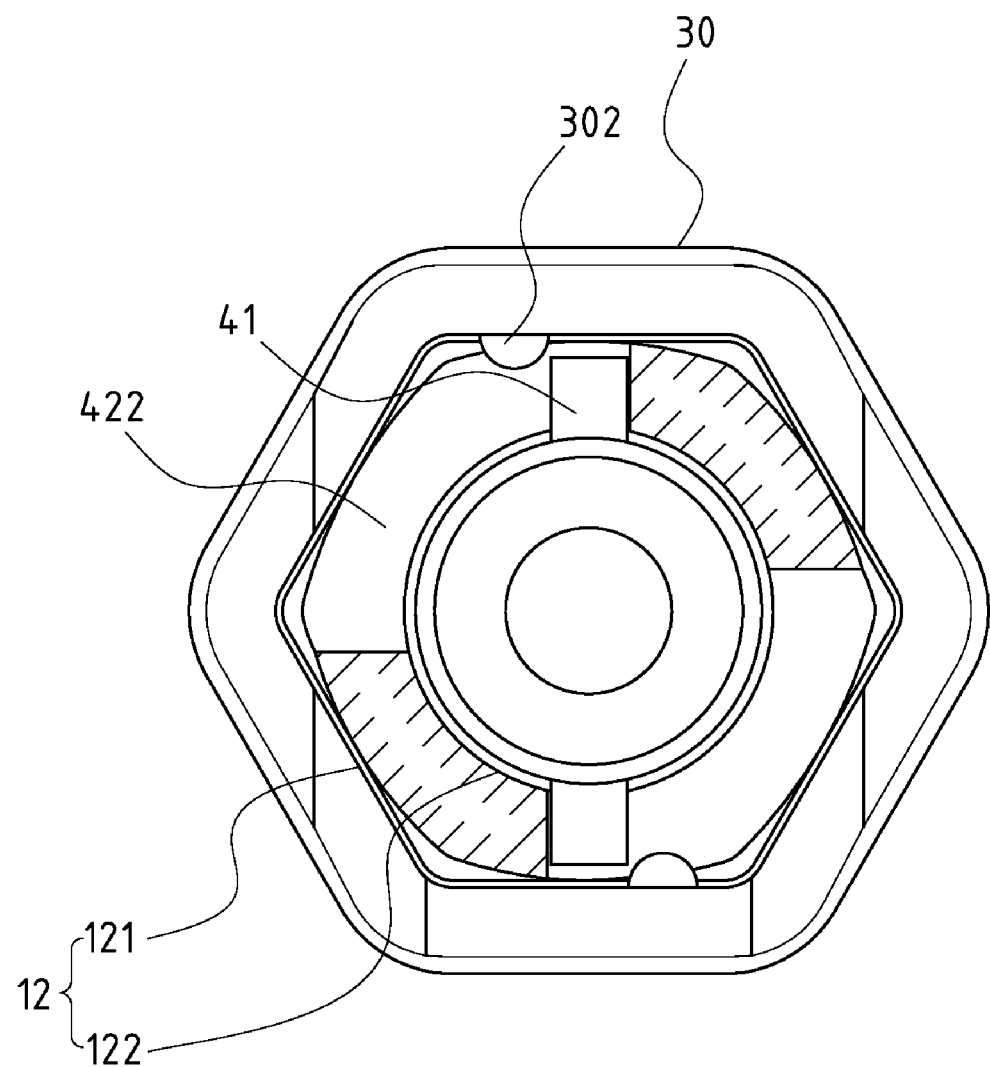
FIG. 7 shows an assembled sectional view of another preferred embodiment of the present invention.

Additionally, referring to FIG. 4 or FIG. 7, the bulge 302 on the locator 32 of the locating part 30 can be sleeved for further positioning of the locking bulge 41, so that the first and second connecting piping 10, 20 can be connected more stably.

We claim:

1. A piping assembly comprising:
a first connecting piping having a first coupling end and a first assembly portion and a first flow channel, said first connecting piping having a first piping head, said first coupling end formed at one end of said first piping head, said first piping head having a male threaded portion at an opposite end thereof, said first assembly portion having an angle block and an inner column, said inner column having a diameter less than a diameter of said angle block, said angle block having a female threaded portion therein, said female threaded portion of said angle block receiving said male threaded portion of said first piping head, said inner column having a pin member extending radially outwardly thereof;
a second connecting piping having a second coupling end and a second assembly portion and a second flow channel, said second connecting piping assembled to said first connecting piping such that said first flow channel is axially aligned with and communicates with said second flow channel, each of said first assembly portion and said second assembly portion having a polygonal shape, said second connecting piping having a second piping head, said second coupling end formed at one end of said second piping head, said second piping head having a male threaded portion at an opposite end thereof, said second assembly portion having a female threaded portion at one end thereof, said female threaded portion receiving said male threaded portion of said second piping head therein, said second assembly portion having an inner wall having an axial trough formed therein and a circular slot formed therethrough, said circular slot extending substantially around a circumference of said second assembly portion, said axial trough opening at an opposite end of said second assembly portion, said axial trough leading to said circular slot, said pin member being slidably received in said circular slot such that said first connecting piping is rotatable relative to said second connecting pipping; and
a locating part having a polygonal through-hole, said locating part being slidably sleeved over a periphery of said first assembly portion and said second assembly portion, said locating part having a bulge extending inwardly from an inner wall thereof, said bulge received in said circular slot of said second assembly portion so as to prevent said first connecting piping from rotating with respect to said second connecting piping.

2. The piping assembly of claim 1, further comprising:
a first check valve core positioned in said first piping head;
a second check valve core positioned in said second piping head;
a first elastic abutting member bearing on said first check valve core and said first piping head; and
a second elastic abutting member bearing on said second check valve core and said second piping head.

3. The piping assembly of claim 1, said locating part having a recessed trough, said bulge extending vertically from one end of said recessed trough.

* * * * *